(12) United States Patent
Tan et al.

(10) Patent No.: US 11,047,632 B2
(45) Date of Patent: Jun. 29, 2021

(54) SUPPORT ASSEMBLY FOR FINNED TUBE TYPE HEAT EXCHANGERS

(71) Applicant: Caterpillar Inc., Deerfield, IL (US)

(72) Inventors: Dongming Tan, Dunlap, IL (US); Virender Kumar, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 149 days.

(21) Appl. No.: 16/256,119

(22) Filed: Jan. 24, 2019

(65) Prior Publication Data

US 2020/0240722 A1 Jul. 30, 2020

(51) Int. Cl.
*F28F 7/00* (2006.01)
*F28F 9/013* (2006.01)

(52) U.S. Cl.
CPC ........ *F28F 9/0138* (2013.01); *F28F 2275/08* (2013.01)

(58) Field of Classification Search
CPC .. F28F 9/0138; F28F 9/00; F28F 9/007; F28F 2275/08
USPC ............................................. 165/67, 69, 162
See application file for complete search history.

(56) References Cited

U.S. PATENT DOCUMENTS

| 2,862,693 | A |   | 12/1958 | Tinker |
|---|---|---|---|---|
| 3,572,770 | A | * | 3/1971 | Kagi .......................... F16L 5/00 |
|   |   |   |   | 285/136.1 |
| 4,570,704 | A | * | 2/1986 | Braun ..................... F28F 1/126 |
|   |   |   |   | 165/162 |
| 5,538,079 | A |   | 7/1996 | Pawlick |
| 6,357,513 | B1 |   | 3/2002 | Janezich et al. |
| 2016/0231066 | A1 | * | 8/2016 | Gopireddy ............ F28F 21/067 |
| 2018/0224216 | A1 |   | 8/2018 | Kennedy et al. |

FOREIGN PATENT DOCUMENTS

| CN | 206832112 | 1/2018 |
|---|---|---|
| DE | 102013215393 | 2/2015 |

* cited by examiner

*Primary Examiner* — Henry T Crenshaw
*Assistant Examiner* — Kamran Tavakoldavani
(74) *Attorney, Agent, or Firm* — Hibshman Claim Construction PLLC

(57) ABSTRACT

A support assembly for attaching a heat exchanger to a frame of a machine. The support assembly including a clip having one or more attachment features for attaching to the frame and a support member disposed between a first fin portion and a second fin portion of the heat exchanger. The support member disposed between the clip and the tube member to at least partially surrounds a perimeter of the tube member and form a seal therewith.

19 Claims, 4 Drawing Sheets

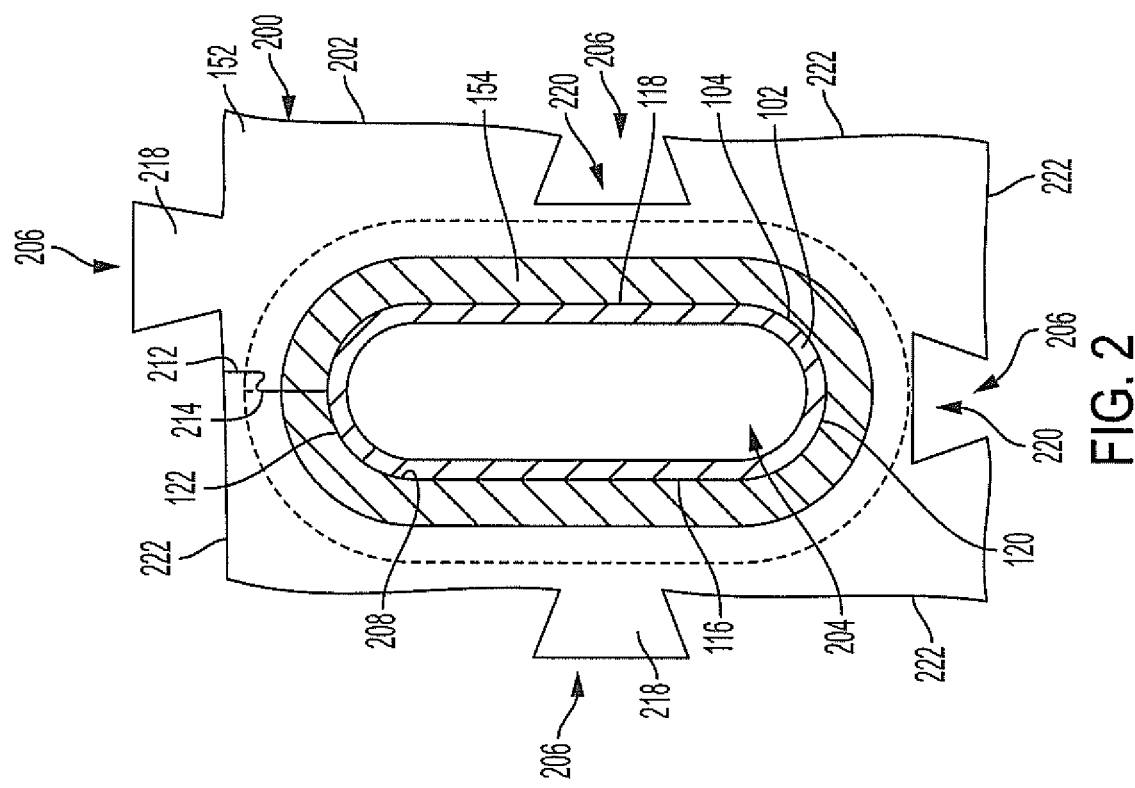
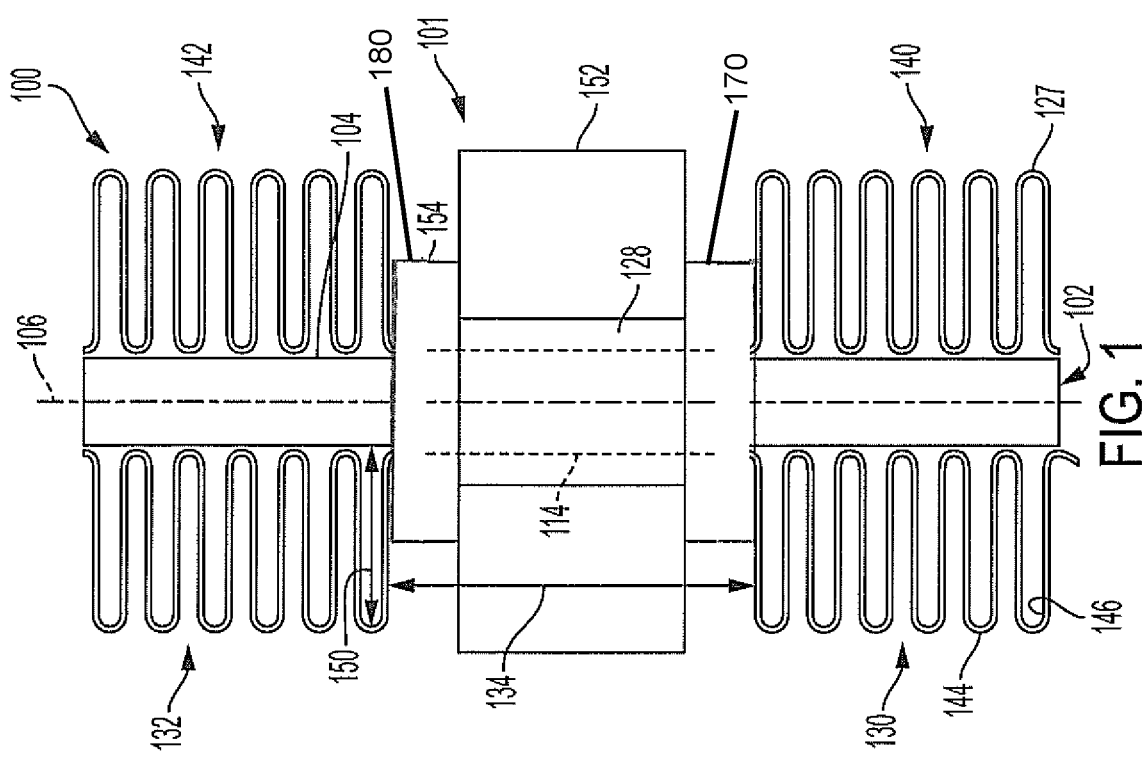

US 11,047,632 B2

SUPPORT ASSEMBLY FOR FINNED TUBE TYPE HEAT EXCHANGERS

TECHNICAL FIELD

The present disclosure relates to a support assembly used to attach heat exchangers to the frame or chassis of a machine. Specifically, the present disclosure relates to a support assembly used to hold onto a finned tube type heat exchanger and attach the heat exchanger to the frame or chassis of earth moving, construction, and mining machine and the like.

BACKGROUND

Machines, such as those used in the earth moving, construction, and mining industries, use heat exchangers to cool engines or other heat producing devices. Support clips are often employed to attach the tube of a heat exchanger, such as a radiator, to a frame or chassis of the machine. The interface between the support clip and tube may experience play that may be caused by internal or external factors. Internal factors of this play may include erosion that occurs due to cavitation of the fluid flowing through the tube, leading to the tube wall deforming inwardly. External factors may include dimensional growth or contraction of the support clip due to changes in temperature or moisture or stack up tolerances.

Play between the support clip and the tube may lead to further issues with wear and/or an improper orientation of the heat exchanger relative to the flow of air meant to draw heat from the tube. In time, a hole may also develop in the tube, resulting in an undesirable loss of cooling fluid from the tube.

U.S. Pat. No. 2,862,693 to Tinker discloses a support clip for finned tubes in a finned tube heat exchanger. The clamping mechanism provided by the support clip is adjustable for ease of assembly and disassembly. A filler is provided between the fins that contacts the tube outer diameter and that is configured to contact an aperture of a frame member. However, as shown in FIGS. 1 thru 5 of Tinker, the disclosed apparatus in Tinker requires that two frame members are provided with apertures such that one aperture of one frame member provides support to the finned tube on only one side while the other aperture of the other frame member contacts the opposite side of the finned tube.

SUMMARY

A support assembly for attaching a heat exchanger to a frame of a machine according to an embodiment of the present disclosure may comprise a clip having one or more attachment features for attaching to the frame and a support member disposed between a first fin portion and a second fin portion of the heat exchanger. The support member disposed between the clip and the tube member to at least partially surround a perimeter of the tube member and form a seal therewith.

A heat exchanger assembly for a machine having a frame according to an embodiment of the present disclosure may comprise a tube member having an exterior surface, a first fin portion attached to the exterior surface, a second fin portion attached to the exterior surface and spaced apart from the first fin portion, a clip attached to the frame, and a support member disposed between the clip and the tube member and between the first fin portion and the second fin portion, wherein the support member at least partially surrounds a perimeter of the tube member and forms a seal therewith A method of supporting a heat exchanger within a machine according to an embodiment of the present disclosure may comprise attaching a tube member of the heat exchanger to a frame of the machine with a clip and forming a compressible seal between the tube member and the clip.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 1 is a front view of a heat exchanger assembly including a finned tube of a heat exchanger being supported by a support assembly according to an exemplary embodiment of the present disclosure.

FIG. 2 is a sectional view of the finned tube and support assembly of FIG. 1.

DETAILED DESCRIPTION

Figure 3:
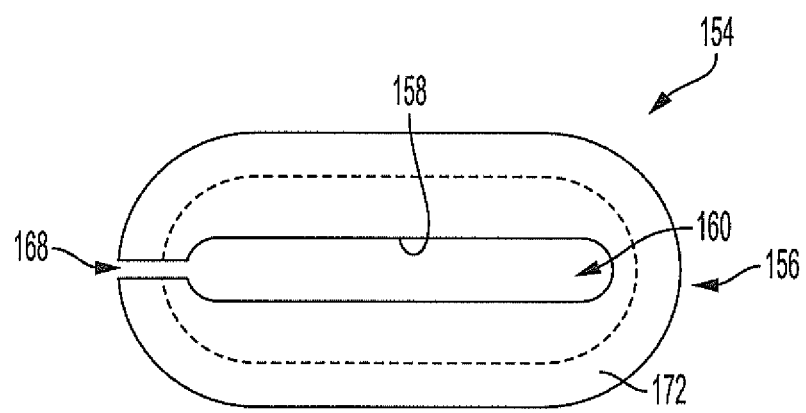
FIG. 3 is a top view of an exemplary embodiment of a support member of the support assembly of FIG. 2.

Reference will now be made in detail to embodiments of the disclosure, examples of which are illustrated in the accompanying drawings. Wherever possible, the same reference numbers will be used throughout the drawings to refer to the same or like parts.

In some embodiments, a heat exchanger assembly that includes a heat exchanger and a clip that interfaces with a tube member of the heat exchanger to attach the heat exchanger to a frame of a machine may be provided. A support member may be disposed between the clip and the tube member to form a seal that prevents debris and other abrasive material from entering between the clip and the tube member.

FIGS. 1 and 2 illustrate an exemplary embodiment of a heat exchanger assembly 50 including a heat exchanger 100 and a support assembly 101 for attaching the heat exchanger 100 to the frame or chassis of a machine. The term "machine" may refer to any machine, such as a fixed or mobile machine, that performs some type of operation associated with an industry such as mining, construction, farming, transportation, or any other industry known in the art. For example, the machine may be an earth moving machine such as a track-type tractor, a motor grader, a backhoe, a loader, a material handler, or any other earth moving machine.

The heat exchanger 100 may include a tube member 102 having an exterior surface 104 and extending along a longitudinal axis 106. As best seen in FIG. 2, the tube member 102 may include an annular configuration including a first straight side 116, a second straight side 118 opposite the first straight side 116, a first arcuate portion 120 connecting the first straight side 116 to the second straight side 118, and a second arcuate portion 122 connecting the first straight side 116 to the second straight side 118. In the illustrated embodiment, the first straight side 116 is parallel to the second straight side 118 and the first arcuate portion 120 is disposed diametrically opposite of the second arcuate portion 122. Hence, the annular configuration may resemble an oval, oblong, or a "race track" shape. In other embodiments, however, the tube member 102 may be otherwise shaped.

The heat exchanger 100 may include a first undulating fin section 130 disposed adjacent the first straight side 116 of tube member 102, a second undulating fin section 132 disposed adjacent the first straight side 116 of the tube member 102 and being spaced away axially from the first undulating fin section 130, defining an axial gap 134. The first undulating fin section 130 may be connected to the second undulating fin section 132 by a straight section (not shown) extending along the first straight side 116 of the tube member 102, but that is optional.

The heat exchanger 100 may include a third undulating fin section 140 disposed adjacent the second straight side 118 of the tube member 102, a fourth undulating fin section 142 disposed adjacent the second straight side 118 of the tube member 102 and being spaced away axially from the third undulating fin section 140, also defining the axial gap 134. The third undulating fin section 140 may be connected to the fourth undulating fin section 142 by a straight section (not shown) extending along the second straight side 118 of the tube member 102, but that is optional.

Each of the undulating fin sections 130, 132, 140, 142 include one or more fin members 144 that include a heat transfer portion 146 extending from the exterior surface 118 of the tube member 102 along a direction 150 that is not parallel to the longitudinal axis 106. In some embodiments, any fin member 144 may have fins that spiral about the exterior surface 104 of the tube member 102 with an axis coincident with the longitudinal axis 106 in lieu of or in addition to the undulations. Also, only one fin member 144 may be provided in other embodiments and the annular configuration of the tube member 102 may have other shapes including rectangular, circular, etc. It is to be further understood that a plurality of tube members with fin members and cross-members that connect tube members together may be provided in various embodiments of the heat exchanger 100.

The tube member 102 and the undulating fin sections 130, 132, 140, 142 may be made from any suitable material or materials with suitably durable and thermal conductivity. In one exemplary embodiment, the tube member 102 and the undulating fin sections 130, 132, 140, 142 are made from aluminum or copper. In one exemplary embodiment, the tube member 102 and the undulating fin sections 130, 132, 140, 142 are made from the same material.

The undulating fin sections 130, 132, 140, 142 may be attached to the tube member 102. The undulating fin sections 130, 132, 140, 142 may be attached to the tube member 102 in any suitable manner. For example, in some embodiments, the undulating fin sections 130, 132, 140, 142 may be brazed to the tube member 102.

The support assembly 101 is disposed in the axial gap 134 and at least partially surrounds the exterior surface 104 of the tube member 102. The support assembly 101 includes a clip 152 and a support member 154. The clip 152 is configured to attach the heat exchanger 100 to the frame of a machine while the support member 154 is disposed between the clip 152 and the tube member 102.

Figure 4:
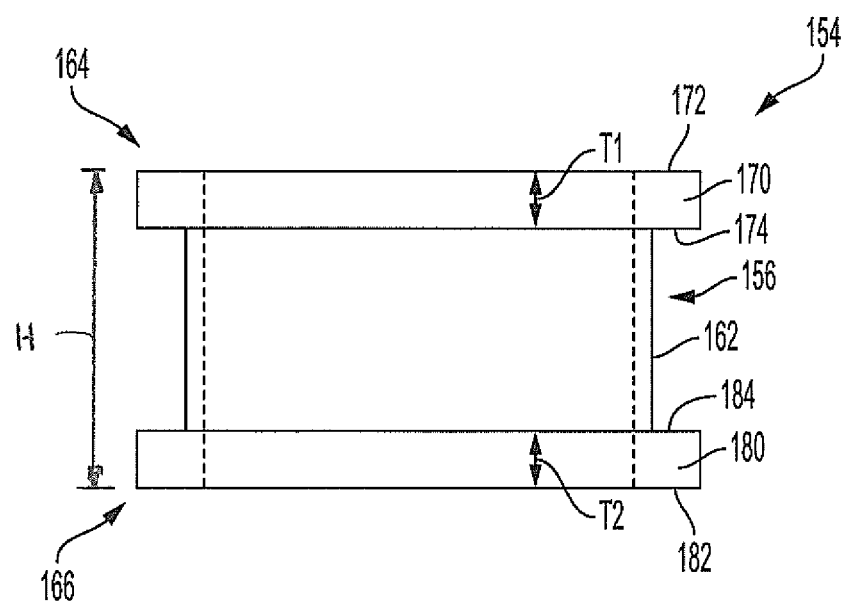
FIG. 4 is a side view of the support member of the support assembly of FIG. 2.

The support member 154 may be configured in a variety of ways. Any configuration that forms a snug fitting interface between the clip 152 and the tube member 102 may be used. Referring to FIGS. 2-4, in the illustrated embodiment, the support member 154 has a generally C-shaped body 156 having a height H, an interior surface 158 defining an aperture 160 and an exterior surface 162 generally parallel to the interior surface 158. In the illustrated embodiment, the aperture 160 is generally shaped similar to the exterior surface 104 of the tube member 102. The body 156 includes a first end portion 164 and a second end portion 166 opposite the first end portion 164 and a seam or channel 168 extending from the first end portion 164 to the second end portion 166.

The first end portion 164 defines a first flange 170 having a thickness T1, a first end face 172, and a first inward facing shoulder 174. The second end portion 166 defines a second flange 180 having a thickness T2, a second end face 182 opposite the first end face 172, and a second inward facing shoulder 184.

The support member 154 may be made of any suitable material capable of forming a seal between the clip 152 and the tube member 102 and withstanding the temperatures associated with operation of the heat exchanger 100. In an exemplary embodiment, the support member 154 is made of a compressible material, such as, for example, any suitable rubber.

Referring to FIG. 2, the clip 152 may comprise a body 200 defining an exterior profile 202, and an adjustably sized aperture 204 configured to receive the support member 154. The exterior profile 202 may define at least one attachment feature 206 and the body 200 may include an interior surface 208 defining the adjustably sized aperture 204.

In particular embodiments, the body 200 may define a living hinge 210 disposed adjacent the exterior profile 202 and forming a portion of the adjustably sized aperture 204. The body 200 may further define a seam 212 connecting the exterior profile 202 to the interior surface 208. The seam 212 may define an undercut 214 configured to keep the body 200 locked in a closed configuration to minimize the size of the adjustably sized aperture 204. Once locked, the interior surface 208 of the clip 152 engages the exterior surface 162 of the support member 154 such that the clip 152 may hug or compress the support member 154.

The at least one attachment feature 206 may take any suitable form including adhesive, fasteners, clips, threaded holes, etc. As shown in FIG. 2, the at least one attachment feature 206 may include at least one of the following: a tenon 218 and a mortise 220.

The exterior profile 202 may take any suitable shape. As shown in FIG. 2, the exterior profile 202 may include a quadrilateral shape with four sides 222. Any or each of the four sides 222 may include the at least one attachment feature 206.

The clip 152 may be made from any suitable material including plastic, metal, etc.

Figure 5:
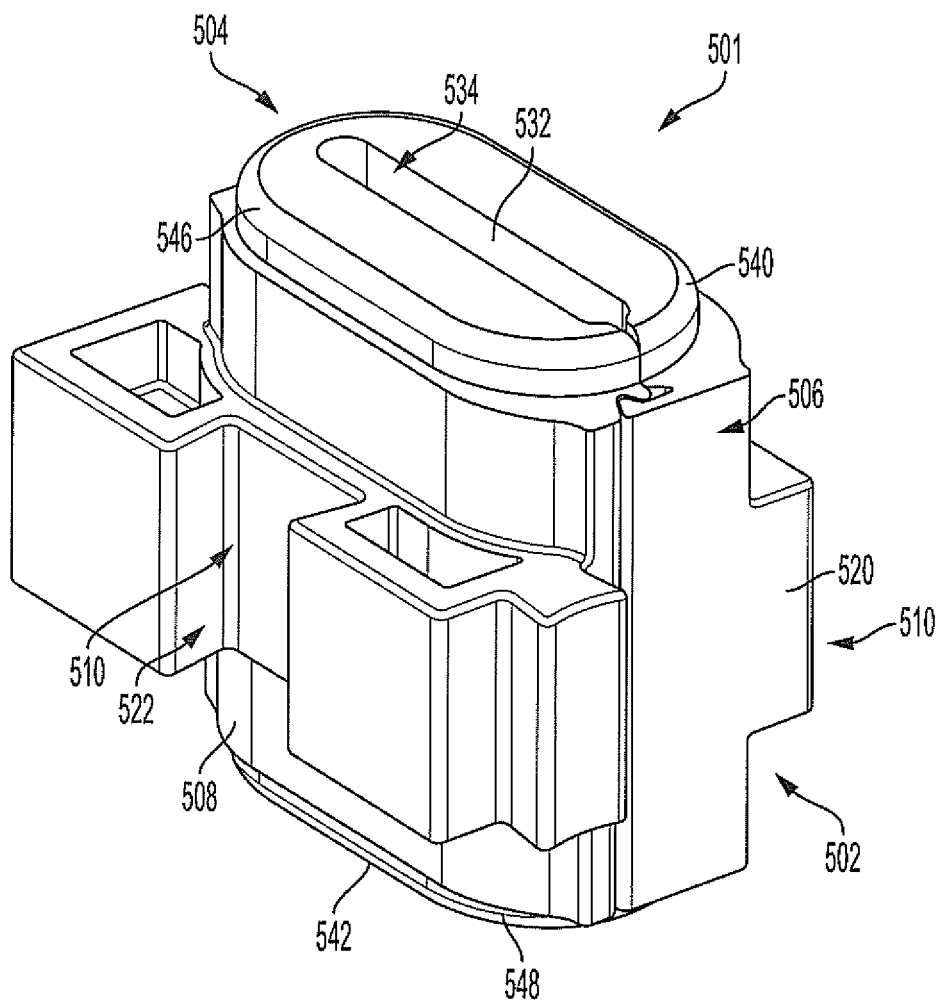
FIG. 5 is a perspective view of a support assembly according to another exemplary embodiment of the present disclosure.
Figure 6:
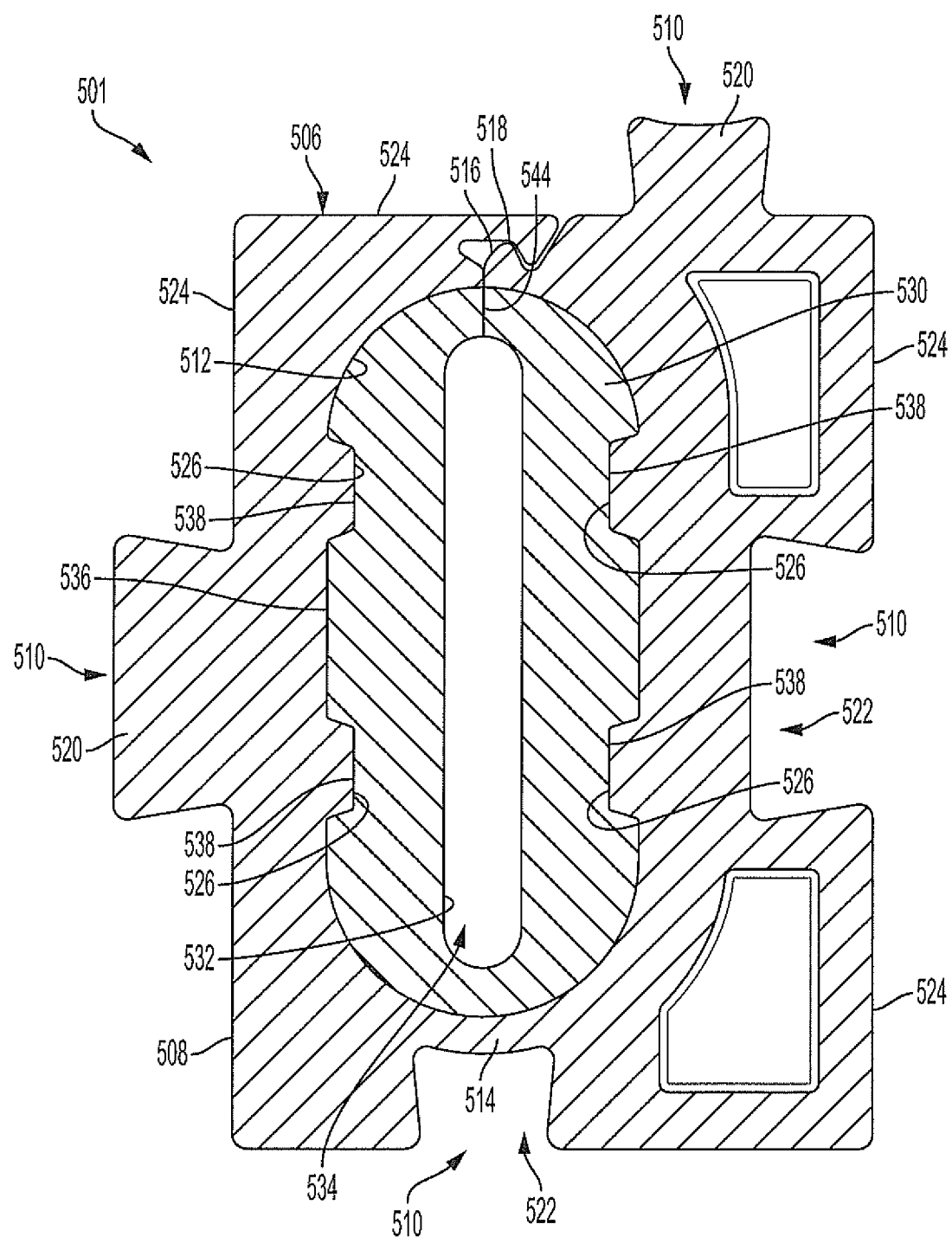
FIG. 6 is a sectional view of the support assembly of FIG. 5.

FIGS. 5-6 illustrate another exemplary embodiment of a support assembly 501 includes a clip 502 and a support member 504. The support assembly 501 of FIGS. 5-6 is similar to the support assembly 101 of FIGS. 1-4 including having the same features. In the support assembly 501, however, the support member 504 is integrally formed with a clip 502.

The clip 502 comprises a body 506 defining an exterior profile 508 having at least one attachment feature 510 and an interior surface 512 configured to attach to or be formed integrally with the support member 504. The body 506 may define a living hinge 514 opposite a seam 516 connecting the exterior profile 508 to the interior surface 512. The seam 516 may define an undercut 518 configured to keep the body 506 locked in a closed configuration.

The at least one attachment feature 510 may take any suitable form including adhesive, fasteners, clips, threaded holes, etc. As shown in FIGS. 5-6, the at least one attachment feature 510 may include at least one of the following: a tenon 520 and a mortise 522.

The exterior profile 508 may take any suitable shape. As shown in FIG. 6, the exterior profile 508 may include a quadrilateral shape with four sides 524. Any or each of the four sides 524 may include the at least one attachment feature 510. The interior surface 512 may include one or more attachment features 526 to aid in attaching to the support member 504. The one or more attachment features 526 may be configured in a variety of ways. In the illustrated embodiment, the one or more attachment features 526 include a plurality of inward extending projections.

The clip 502 may be made from any suitable material including plastic, metal, etc.

The support member 504 may be configured in a variety of ways. Any configuration that can be attached or formed onto the interior surface 512 of the clip 502 and forms a snug fitting interface to the tube member 102 may be used. In the illustrated embodiment, the support member 504 has a generally C-shaped body 530 having an interior surface 532 defining an aperture 534 and an exterior surface 536 generally parallel to the interior surface 532. The exterior surface 536 may include one or more attachment features 538 to aid in attaching to the interior surface 512 of the clip 502. The one or more attachment features 538 may be configured in a variety of ways. In the illustrated embodiment, the one or more attachment features 538 include a plurality of recesses for receiving the projections on the interior surface 512 of the clip 502.

In the illustrated embodiment, the aperture 534 is generally shaped similar to the exterior surface 104 of the tube member 102. The body 530 includes a first end portion 540 and a second end portion 542 opposite the first end portion 540 and a channel or seam 544 extending from the first end portion 540 to the second end portion 542. The first end portion 540 may define an optional first flange 546 and the second end portion 542 may define an optional second flange 548.

The support member 504 may be made of any suitable material capable of forming a seal with the tube member 102 and being formed with or attached to the interior surface 512 while withstanding the temperatures associated with operation of the heat exchanger 100. In an exemplary embodiment, the support member 504 is made of an elastic and compressible material, such as, for example, any suitable rubber.

The support member 504 may be attached to the interior surface 512 of the clip 502 in any suitable manner, such as molding onto, attached via adhesives, an interference or friction fit, fasteners, or other suitable forms of attachment.

INDUSTRIAL APPLICABILITY

The disclosed support assemblies 101, 201 may be used to support the heat exchanger 100 within an earth moving machine, such as, for example, a track-type tractor, a motor grader, a backhoe, a loader, a material handler, or any other earth moving machine. The clip and support member of the support assembly may wrap around the tube member of the heat exchanger and the clip may further attach to another portion of the machine, such as for example a frame portion, either directly or indirectly by connecting to another clip or other component.

In practice, the heat exchanger, the heat exchanger assembly, the support assembly, the clip, the support member, and/or the machine using any embodiment disclosed herein may be sold, bought, manufactured or otherwise obtained in an OEM (original equipment manufacturer) or after-market context. In some cases, various components, of the heat exchanger, of the heat exchanger assembly, of the machine, of the support assembly, etc. may be provided as a kit, etc.

Using the exemplary embodiment of FIGS. 1-4 as an example, in operation, the support assembly 101 may at least partially encompass a portion of the tube member 102 of a heat exchanger 100 to attach the heat exchanger to the frame of the machine. In particular, an exemplary embodiment of a method for supporting the heat exchanger 100 within the frame of a machine may include placing the support member 154 at least partially around the portion of the tube member 102 within the axial gap 134. In some embodiments, the support member 154 surrounds the entire perimeter of the portion of the tube member 102 in the axial gap 134.

Since the support member 154 is may be made from an elastic material such as rubber, the support member 154 can be spread open to increase the size of the channel 168 such that the tube member 102 can slide through the channel 168 and be received within the aperture 160. Once released, the support member 154 wraps around the tube member 102. The aperture 160 may be sized to be slightly smaller than the perimeter of the exterior surface 118 of the tube member 102 such that the support member 154 is slightly compressed and forms a snug or tight fit around the exterior surface 118 of the tube member 102 to form a seal therebetween.

In the illustrated embodiment, the height H of the support member 154 may be the same as or slightly larger than the axial gap 134. Thus, the first end face 172 of the first flange 170 may abut one or both of the second and fourth undulating fin sections 132, 142 and the second end face 182 of the second flange 180 may abut one or both of the first and third undulating fin sections 130, 140. Therefore, the support member 154 may be slightly axially compressed and captured between the undulating fin sections 130, 132, 140, 142 such that the position of the support member 154 is fixed relative to the tube member 102.

In other embodiments, however, the support member 154 may have a height that is smaller than the axial gap 134 and is thus, not captured between the undulating fin sections 130, 132, 140, 142. For example, in at least one embodiment of the support assembly 501 in which the support member is attached to the interior surface of the clip, the height of the support member is less than the axial gap 134.

Once the support member 154 is on the tube member 102 such that the tube member 102 axially extends through the aperture 160, the clip 152 can be attached to the support member 154 and the tube member 102. To attach the clip 152 to the support member 154, the clip 152 can be opened via the living hinge 210 to enlarge the adjustably sized aperture 204. The opened clip 152 can be positioned adjacent to the support member 154 and closed onto the support member 154 between the first flange 170 and the second flange 180 such the interior surface 208 of the clip 152 engages the exterior surface 162 of the support member 154.

In the closed configuration, the undercut 214 can be engaged to lock the clip 152 in a closed configuration. Further, in the closed configuration, the adjustably sized aperture 204 of the clip 152 may be slightly smaller than the perimeter of the exterior surface 162 of the support member 154 such that the clip 152 may compress the support member 154 to form a snug fit and seal therebetween. The compression of the support member 154 may result in the channel 168 closing such that the support member 154 completely encompasses the tube member 102.

Further, in the closed position, the clip 152 is sandwiched between the first inward facing shoulder 174 and the second inward facing shoulder 184. Thus, the position of the support member 154 is fixed relative to the clip 152.

Once the clip 152 is secured onto the support member 154, the at least one attachment feature 206 may be used to attach the clip 152 to an adjacent clip having a complementary attachment feature or to the frame. Since any or each of the four sides 222 may include at least one attachment feature 206, the clip 152 may attach to adjacent clips or the frame on multiple sides 222

The support assembly 101, once installed, attaches the heat exchanger 100 to the frame of the machine. The support member 154 is captured between the undulating fin sections 130, 132, 140, 142 of the heat exchanger 100 and the clip 152 is captured between the first and second inward facing shoulders 174, 184 of the support member 154. Thus, the positions and orientations of the clip 152, the support member 154, and the tube member 102 of the heat exchanger 100 are fixed relative to each other. Further, the snug fit between the support member 154 and the tube member 102 provides a seal that prevents debris, such as dirt, sand or other abrasive material, and other material that could cause abrasive wear from entering between the support member 154 and the tube member 102

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

ELEMENT LIST

| Element Number | Element Name |
| --- | --- |
| 50 | heat exchanger assembly |
| 100 | heat exchanger |
| 101 | support assembly |
| 102 | tube member |
| 104 | exterior surface |
| 106 | longitudinal axis |
| 118 | exterior surface |
| 120 | first arcuate portion |
| 122 | second arcuate portion |

-continued

| Element Number | Element Name |
| --- | --- |
| 130 | first undulating fin section |
| 132 | second undulating fin section |
| 134 | axial gap |
| 140 | third undulating fin section |
| 142 | fourth undulating fin section |
| 144 | fin members |
| 146 | heat exchanger portion |
| 150 | direction |
| 152 | clip |
| 154 | support member |
| 156 | c-shaped body |
| 158 | interior surface |
| 160 | aperture |
| 162 | exterior surface |
| 164 | first end portion |
| 166 | second end portion |
| 168 | channel |
| 170 | first flange |
| 172 | first end face |
| 174 | first inward facing shoulder |
| 180 | second flange |
| 182 | second end face |
| 184 | second inward facing shoulder |
| 200 | body |
| 201 | disclosed support assemblies |
| 202 | exterior profile |
| 204 | adjustably sized aperture |
| 206 | attachment feature |
| 208 | interior surface |
| 210 | living hinge |
| 212 | seam |
| 214 | undercut |
| 218 | tenon |
| 220 | mortise |
| 222 | sides |
| 501 | support assembly |
| 502 | clip |
| 504 | support member |
| 506 | body |
| 508 | exterior profile |
| 510 | attachment feature |
| 512 | interior surface |
| 514 | living hinge |
| 516 | seam |
| 518 | undercut |
| 520 | tenon |
| 522 | mortise |
| 524 | side |
| 526 | attachment features |
| 530 | c-shaped body |
| 532 | interior surface |
| 534 | aperture |
| 536 | exterior surface |
| 538 | attachment features |
| 540 | first end portion |
| 542 | second end portion |
| 544 | seam |
| 546 | first flange |
| 548 | second flange |

What is claimed is:

1. A support assembly for a heat exchanger, the heat exchanger having a tube member, a first fin portion, and a second fin portion spaced apart from the first fin portion, the support assembly comprising:
a clip having one or more attachment features; and
a support member disposed between the clip and the tube member and between the first fin portion and the second fin portion, wherein the support member at least partially surrounds a perimeter of the tube member and is disposed in direct contact with the tube member to form a seal therewith.

2. The support assembly of claim 1, wherein the support member completely surrounds the perimeter of the tube member.

3. The support assembly of claim 1, wherein the support member defines an aperture through which the tube member extends.

4. The support assembly of claim 3, wherein the clip defines an adjustably sized aperture through which the support member extends.

5. The support assembly of claim 4, wherein the support member is compressed between the clip and the tube member.

6. The support assembly of claim 3, wherein the support member is attached to an interior surface of the clip.

7. The support assembly of claim 6, wherein the support member is molded to the interior surface of the clip.

8. The support assembly of claim 1, wherein the support member includes rubber.

9. The support assembly of claim 1, wherein the support member includes a first flange and a second flange opposite the first flange, and
wherein the first flange is sandwiched between the first fin portion and the clip and the second flange is sandwiched between the second fin portion and the clip.

10. The support assembly of claim 9, wherein the support member is compressed between the first fin portion and the second fin portion.

11. A heat exchanger assembly comprising:
a tube member having an exterior surface;
a first fin portion attached to the exterior surface;
a second fin portion attached to the exterior surface and spaced apart from the first fin portion;
a clip including an attachment feature; and
a support member disposed between the clip and the tube member and between the first fin portion and the second fin portion, wherein the support member at least partially surrounds a perimeter of the tube member and is disposed in direct contact with the tube member to form a seal therewith.

12. The heat exchanger assembly of claim 11, wherein the support member defines an aperture through which the tube member extends.

13. The heat exchanger assembly of claim 12, wherein the clip defines an adjustably sized aperture through which the support member extends, and
the support member is compressed between the clip and the tube member.

14. The heat exchanger assembly of claim 12, wherein the support member is attached to an interior surface of the clip.

15. The heat exchanger assembly of claim 11, wherein the support member includes rubber.

16. The heat exchanger assembly of claim 11, wherein the support member includes a first flange and a second flange opposite the first flange, and
wherein the first flange is sandwiched between the first fin portion and the clip and the second flange is sandwiched between the second fin portion and the clip.

17. The heat exchanger assembly of claim 11, wherein the support member is compressed between the first fin portion and the second fin portion.

18. A method for supporting a heat exchanger, the heat exchanger having a tube member, a first fin portion attached to the tube member, and a second fin portion attached to the tube member and spaced apart from the first fin portion, the method comprising:
at least partially surrounding the tube member with a support member, the support member being made from a compressible material and being in direct contact with the tube member:
at least partially surrounding the support member with a clip, the clip including an attachment feature; and
compressing the support member between the tube member and the clip to form a seal between the tube member and the support member.

19. The method of claim 18, wherein the support member is attached to an interior surface of the clip.

* * * * *